(12) United States Patent
Hakim et al.

(10) Patent No.: US 10,885,370 B2
(45) Date of Patent: Jan. 5, 2021

(54) SELECTING OBJECT DETECTIONS OR RECOGNITIONS USING CORRECTNESS MAPPINGS

(71) Applicant: International Business Machines Corporation, Armonk, NY (US)

(72) Inventors: Tal Hakim, Haifa (IL); Dror Porat, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 16/221,524

(22) Filed: Dec. 16, 2018

(65) Prior Publication Data

US 2020/0193204 A1    Jun. 18, 2020

(51) Int. Cl.
  *G06K 9/32*    (2006.01)
  *G06K 9/62*    (2006.01)
  *G06N 3/08*    (2006.01)

(52) U.S. Cl.
  CPC ............. *G06K 9/325* (2013.01); *G06K 9/623* (2013.01); *G06K 9/6227* (2013.01); *G06N 3/08* (2013.01)

(58) Field of Classification Search
  None
  See application file for complete search history.

(56) References Cited

U.S. PATENT DOCUMENTS

| | | | | |
|---|---|---|---|---|
| 5,832,108 A | * | 11/1998 | Fukita | G06K 9/66 382/159 |
| 2011/0040706 A1 | * | 2/2011 | Sen | G06N 20/00 706/12 |
| 2016/0071022 A1 | | 3/2016 | Bruno et al. | |
| 2017/0351956 A1 | | 12/2017 | Dubey et al. | |

OTHER PUBLICATIONS

Djamel Bouchaffra et el.; "A Methodology for Mapping Scores of Probabilities", IEE Transactions on Pattern Analysis and Machine Intelligence, vol. 21 No. 9, Sep. 1999, 5 pages.
Youssef Kadri et al.; "Combining Resources with Confidence Measures for Cross Language Information Retrieval", ResearchGate, Nov. 9, 2007, 8 pages.

* cited by examiner

*Primary Examiner* — David Perlman (57) ABSTRACT

An example system includes a processor to receive detections or recognitions with confidence scores for an object in a medium from a plurality of trained detection or recognition models. The processor is to generate a probability of correctness for each of the detections or recognitions based on the confidence scores via correctness mappings generated for each of the trained detection or recognition models. The processor is to also select a detection or recognition with a higher probability of correctness from the detections or recognitions. The processor is to perform a detection or recognition task based on the selected detection or recognition.

18 Claims, 9 Drawing Sheets

SELECTING OBJECT DETECTIONS OR RECOGNITIONS USING CORRECTNESS MAPPINGS

BACKGROUND

The present techniques relate to object detection and object recognition in images. More specifically, the techniques relate to selection of a detection or recognition from a number of detections or recognitions by different object detectors or object recognizers.

SUMMARY

According to an embodiment described herein, a system can include processor to receive detections or recognitions with confidence scores for an object in a medium from a plurality of trained detection or recognition models. The processor can also further generate a probability of correctness for each of the detections or recognitions based on the confidence scores via correctness mappings generated for each of the trained detection or recognition models. The processor can also select a detection or recognition with a higher probability of correctness from the detections or recognitions. The processor can further perform a detection or recognition task based on the selected detection or recognition.

According to another embodiment described herein, a method can include receiving, via a processor, detections or recognitions with confidence scores for an object in a medium from a plurality of trained detection or recognition models. The method can further include generating, via the processor, a probability of correctness for each of the detections or recognitions based on the confidence scores via correctness mappings generated for each of the trained detection or recognition models. The method can also further include selecting, via the processor, a detection or recognition with a higher probability of correctness from the detections or recognitions. The method can also include performing, via the processor, a detection or recognition task based on the selected detection or recognition.

According to another embodiment described herein, a computer program product for performing detection or recognition tasks can include computer-readable storage medium having program code embodied therewith. The computer readable storage medium is not a transitory signal per se. The program code executable by a processor to cause the processor to receive detections or recognitions with confidence scores for an object in a medium from a plurality of trained detection or recognition models. The program code can also cause the processor to generate a probability of correctness for each of the detections or recognitions based on the confidence scores via correctness mappings generated for each of the trained detection or recognition models. The program code can also cause the processor to select a detection or recognition with a higher probability of correctness from the detections or recognitions. The program code can also cause the processor to perform a detection or recognition task based on the selected detection or recognition.

DETAILED DESCRIPTION

Multiple object detection or recognition models can be used to detect objects in images. For example, the objects may include text, logos, or any other objects. However, the confidence scores output by the object detection or recognition models may not be comparable. For example, a detection or recognition with a high confidence score for one object detection or recognition model may not be as correct as a detection or recognition having a lower score from another object detection or recognition model. Furthermore, in some cases, multiple object detection or recognition models may output highly overlapping detections or recognitions, while not agreeing about the detection or recognition identity. The detection or recognition scores output by the different object detection or recognition models are not on the same scale, and thus, the detection or recognition scores may be incomparable.

According to embodiments of the present disclosure, a system includes a processor to receive detections or recognitions with confidence scores for an object in an image from a plurality of trained detection or recognition models. For example, recognitions can be in context of a whole image, such as in image recognition. Detections can be in specific areas localized within bounding boxes. The processor can generate a probability of correctness for each of the detections or recognitions based on the confidence scores via correctness mappings for each of the trained detection or recognition models. The processor selects a detection or recognition with a higher probability of correctness from the detections or recognitions. The processor then performs a recognition task based on the selected detection or recognition. For example, the detection or recognition task is done by selecting one of the input detections or recognitions and using the detection or recognition as an output. Thus, embodiments of the present disclosure allow detections from multiple trained objection detection or recognition models to be effectively and automatically be used in detection or recognition tasks.

In some scenarios, the techniques described herein may be implemented in a cloud computing environment. As discussed in more detail below in reference to at least FIGS. 6-9, a computing device configured to generate correctness mappings and select detections or recognitions based on the correctness mappings may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
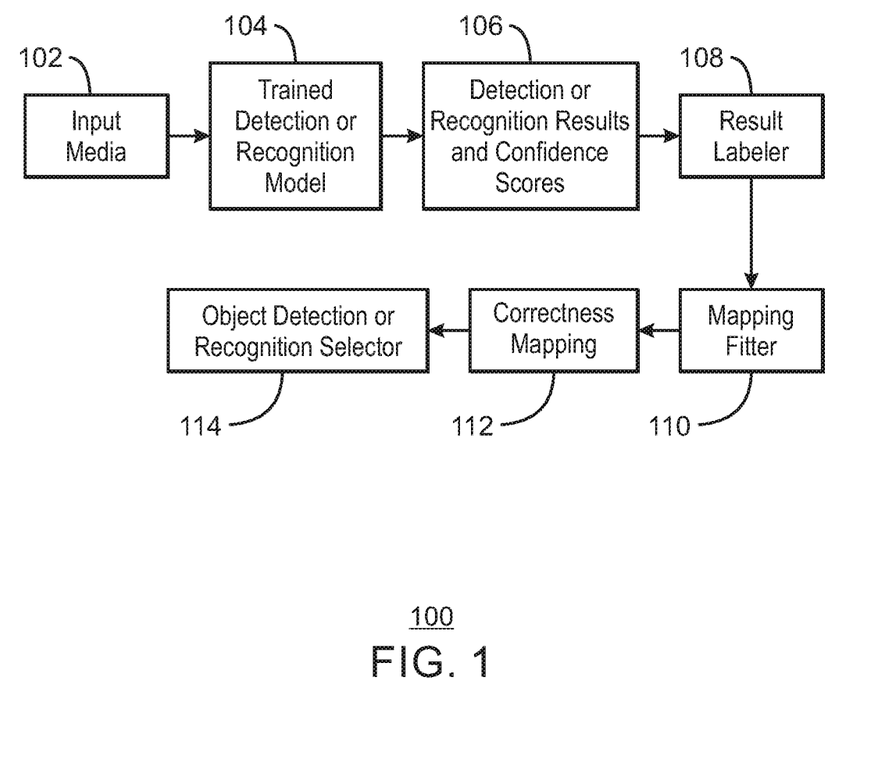
FIG. 1 is a block diagram of an example system for generating a correctness mapping and selecting object detections or recognitions from detections or recognitions of multiple object detectors or recognizers using a correctness mapping.

With reference now to FIG. 1, a block diagram shows an example system for generating a correctness mapping and selecting object detections or recognitions from detections or recognitions of multiple object detectors or object recognizers using a correctness mapping. The example system 100 includes input media 102 shown received at a trained detection or recognition model 104. In various examples, the media 102 includes images, audio, features, or any other form of data. In some examples, the detection or recognition model 104 is a trainable model. For example, the detection or recognition model 104 can be a trained neural network, such as a convolutional neural network trained to detect objects. The system 100 includes a set of detection or recognition results 106 and scores. For example, the scores are confidence scores. In some examples, a confidence score is generated by the trained detection or recognition model 104 for each object detected by the trained detection or recognition model 104. The system 100 includes a result labeler 108 communicatively coupled to the trained detection or recognition model 104. The system 100 also further includes a mapping fitter 110 communicatively coupled to the result labeler 108. The mapping fitter 110 is shown generating a correctness mapping 112. The system 100 includes an object detection or recognition selector 114 communicatively coupled to the mapping fitter 110.

In the example of FIG. 1, the input media 102 is a training data set of labeled data. For example, the input media 102 can be a set of images with labeled ground truths, such as to be detected or recognized. The detection or recognition results 106 are a set of detections or recognitions and associated confidence scores. For example, the detections or recognitions can be detected words in the case of text detection or recognition models. The result labeler 108 can group detection or recognition results 106 together based on confidence scores and label each of the detection or recognition results 106 as correct or incorrect based on a comparison of the detection or recognition result with a ground truth label from the input media 102.

Still referring to FIG. 1, the mapping fitter 110 can compute the rate of correct samples in each group of confidence values. For example, the mapping fitter 110 can set the centroid of each group of detection or recognition results as a certainty anchor and determine that a probability of correctness of the centroid is its group's rate of correct outputs. The centroid is the mean of the confidences of each group of detection or recognition results. The probability of correctness can be the value of the mapping function given the certainty centroid as an input. In some examples, using linear or nonlinear interpolations and extrapolations between the function values at the anchors, the mapping fitter 110 forms a continuous function, referred to herein as a correctness mapping 112, that turns model certainty into an approximated probability of correctness. The correctness mapping 112 can thus be generated by curve fitting the approximated probability of correctness of the centroid at each of quantized confidences. In various examples, a correctness mapping 112 can thereby be generated for each of a number of trained detection or recognition models 104.

An object detection or recognition selector 114 can use the correctness mapping 112 to select a particular detection or recognition among various detection or recognition results. For example, the object detection or recognition selector 114 can map the confidence scores for each of the detection or recognition results based on the correctness mappings 112 generate for the associated detection or recognition model. The object detection or recognition selector 114 then selects a detection or recognition that has a higher probably of correctness than other detection or recognition results.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional resource servers, etc.).

Figure 2:
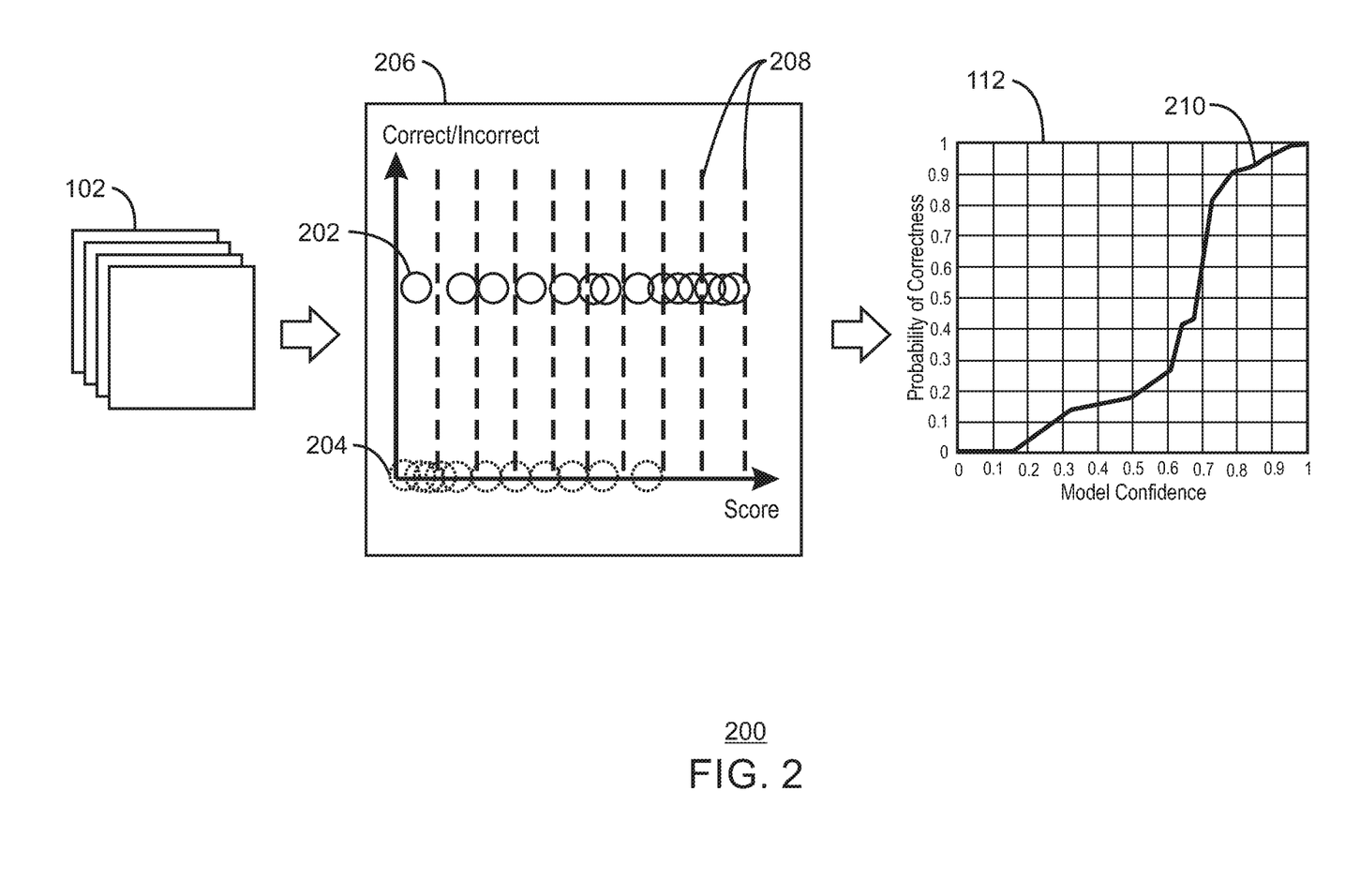
FIG. 2 is a drawing of an example process for generating a correctness mapping for an object detection or recognition model.

FIG. 2 is a drawing of an example process for generating a correctness mapping for an object detection or recognition model. The process 200 can be implemented using the system 100 of FIG. 1, the computing device 800 of FIG. 8 or the computer-readable media 900 of FIG. 9.

The process 200 includes receiving a number of training media 102. As one example, the training media 102 can be images that include labeled objects for purposes of training. The process 200 includes labeling a set of received object detections or recognitions from an object detection or recognition model as correct detections or recognitions 202 indicated by solid circles and incorrect detections or recognitions 204 indicated by dashed circles and plotting them in a binned graph 206 against their associated confidence scores. The binned graph 206 includes a set of bins 208 indicated by dashed lines. The bins 208 divide the axis representing confidence scores into a predetermined number of bins. As example, a bin is created for each 0.1 of a confidence value. The bins are thus used to quantize the confidence values. In some examples, any predetermined number of bins is used. In various examples, the correctness labeling can be based on a ground truth data set. In some examples, the ground truth dataset may be received in the training images as annotations. For example, each of the training images may include one or more annotated objects. The process 200 includes generating a correctness mapping 112 including a function 210 of probability of correctness versus confidence scores for a particular object detection or recognition model. In various examples, the process 200 is performed for each object detection or recognition model used in a system.

It is to be understood that the drawing of FIG. 2 is not intended to indicate that the process 200 is to include all of the components shown in FIG. 2. Rather, the process 200 can include fewer or additional components not illustrated in FIG. 2 (e.g., additional input training media, object detections or recognitions, correctness mappings, etc.).

Figure 3:
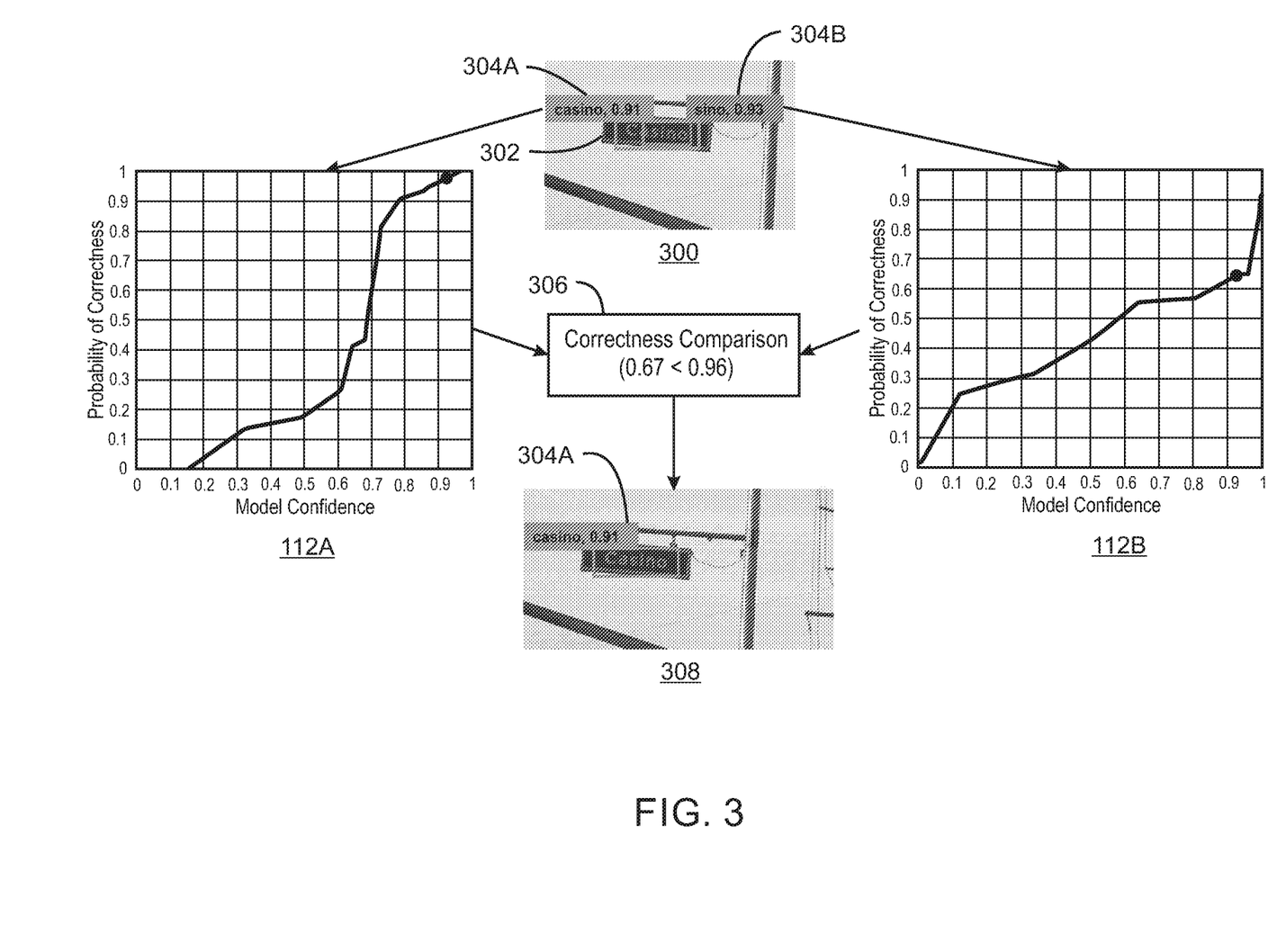
FIG. 3 is a drawing of an example process for selecting a detection or recognition from multiple detections or recognitions in an image using correctness mappings.

FIG. 3 is a drawing of an example process for selecting a detection or recognition from multiple detections or recognitions in an image using correctness mappings. The process 300 can be implemented using the system 100 of FIG. 1, the computing device 800 of FIG. 8 or the computer-readable media 900 of FIG. 9.

The process 300 includes receiving an image 300 including a detected or recognized object 302. The detected or recognized object 302 has two associated object detections or recognitions 304A and 304B generated by two different object detection or recognition models.

The process 300 includes generating a probability of correctness based on the confidence score for each of the object detections or recognitions 304A and 304B using the associated correctness mappings 112A and 112B. In various examples, the confidence score of each object detection or recognition can be used to look up an associated probability of correctness in the corresponding correctness mapping for the object detection or recognition model. For example, the confidence score of 0.91 for the detection or recognition 304A of "casino" is used to lookup an associated probability of correctness of 0.96 in the correctness mapping 112A. Similarly, the confidence score of 0.93 for the detection or recognition 304B of "sino" is used to lookup an associated probability of correctness of 0.67 in the correctness mapping 112B.

The process 300 includes comparing the probabilities of correctness retrieved from the correctness mappings 112A and 112B. For example, the probability of correctness of 0.96 for the object detection or recognition 304A is greater than the probability of correctness of 0.67 for the object detection or recognition 304B. The process 300 includes selecting the detection or recognition result with a higher probability of correctness. In the example of FIG. 3, the object detection or recognition 304A is selected and included in the output detection or recognition image 308. In various examples, the selected object detection or recognition can be used in performing a detection or recognition task. For example, the detection or recognition task can be a video, audio, feature detection or recognition, or any other detection or recognition task. In some examples, the detection or recognition task is a text detection or recognition task.

It is to be understood that the drawing of FIG. 3 is not intended to indicate that the process 300 is to include all of the components shown in FIG. 3. Rather, the process 300 can include fewer or additional components not illustrated in FIG. 3 (e.g., additional images, types of media, detected objects, object detections or recognitions, generated correctness mappings, correctness comparisons, output images or media, etc.).

Figure 4:
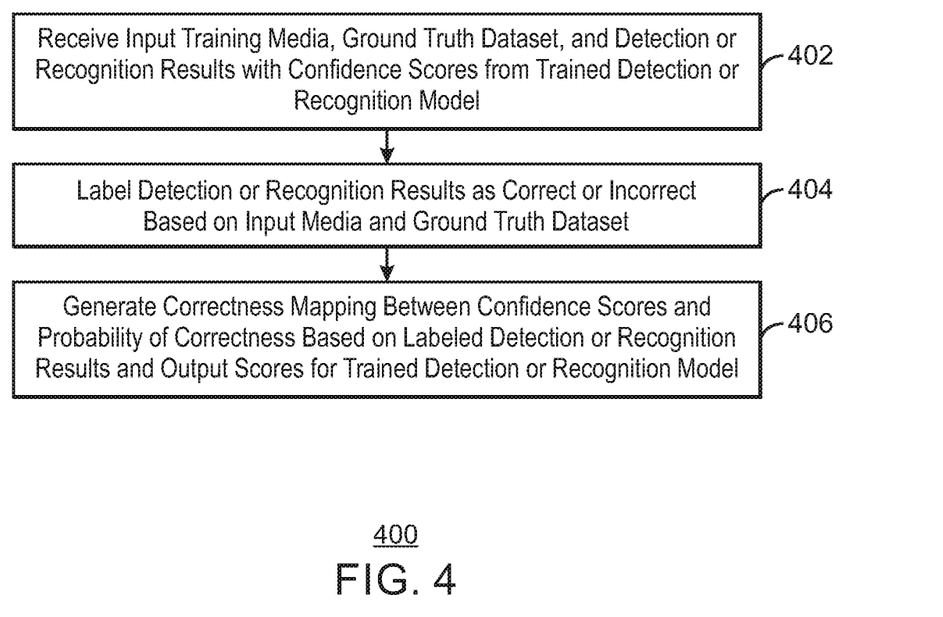
FIG. 4 is a block diagram of an example method that can generate correctness mappings.

FIG. 4 is a process flow diagram of an example method that can generate correctness mappings. The method 400 can be implemented with any suitable computing device, such as the computing device 600 of FIG. 6 or the processor 702 of FIG. 7. For example, the methods described below can be implemented by the mapping module 626 and processor 102 or the mapping module 908 and the processor 902 of FIGS. 6 and 9.

At block 402, input training media, a ground truth dataset, and detection or recognition results with confidence scores are received from a trained detection or recognition model. In some examples, the media are images, audio, features, or any other form of data. In some examples, the ground truth dataset can be included as annotations in the media.

At block 404, the detection or recognition results are labeled as correct or incorrect based on input media and the ground truth dataset. For example, each of the detection or recognition results are compared to the corresponding labels in the ground truth data set and labeled as correct in response to detecting that the detection or recognition results match the labels or incorrect in response to detecting that the detection or recognition results do not match the labels.

At block 406, a correctness mapping between confidence scores and probability of correctness is generated based on labeled detection or recognition results and output scores for the trained detection or recognition model. In various examples, the confidence scores of the detection or recognition models are quantized using a predetermined number of bins and a rate of correct samples is calculated in each bin. In some examples, a centroid of each group of labeled detection or recognition results is set in a bin of a binned graph as a certainty anchor.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the method 400 can be performed for each of a number of detection or recognition models.

Figure 5:
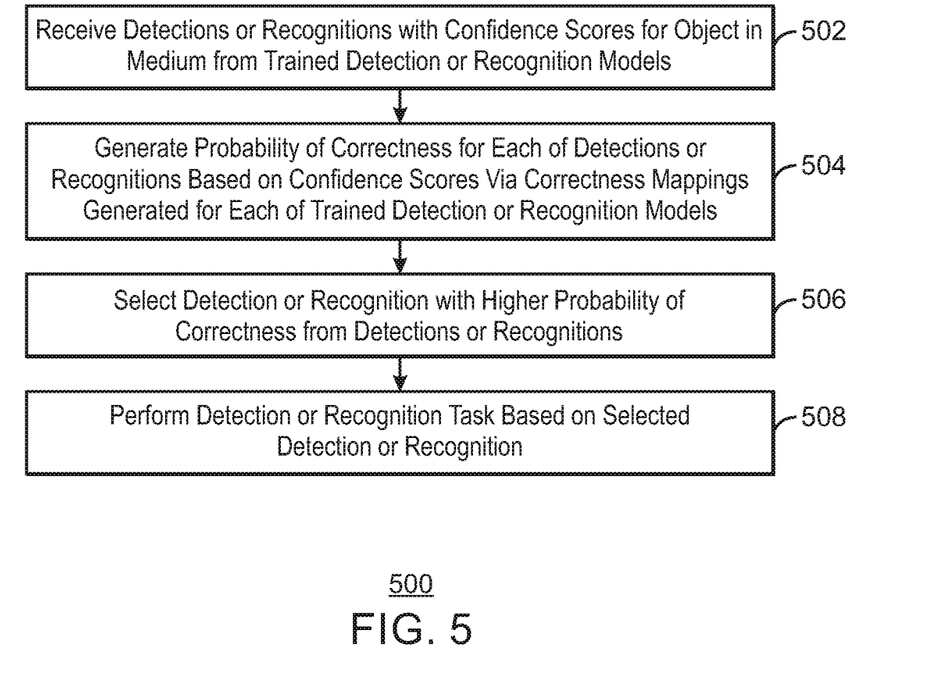
FIG. 5 is a block diagram of an example method that can select an object detection or recognition from detections or recognitions of multiple object detectors or recognizers using a correctness mapping.

FIG. 5 is a process flow diagram of an example method that can select an object detection or recognition from detections or recognitions of multiple object detectors or object recognizers using a correctness mapping. The method 500 can be implemented with any suitable computing device, such as the computing device 600 of FIG. 6 or the processor 902 of FIG. 9. For example, the methods described below can be implemented by the mapping module 626 and processor 102 or the mapping module 908 and the processor 902 of FIGS. 6 and 9.

At block 502, detections or recognitions with confidence scores for an object in a medium are received from a number of trained detection or recognition models. For example, the trained detection or recognition models may be trained convolutional neural networks. In various examples, the trained detection or recognition models are trained to detect objects using a training data set with annotated objects. In some examples, the medium is an image. In some examples, the medium is audio, or any other medium.

At block 504, a probability of correctness for each of the detections or recognitions is generated based on the confidence scores via correctness mappings generated for each of the trained detection or recognition models. For example, each of the confidence scores can be mapped to a probability of correctness using a correctness mapping for the detection or recognition model that generated each confidence score. In some examples, the correctness mappings can be generated using the method 400 of FIG. 4. For example, the correctness mapping can be generated based on input training media, a ground truth dataset, and detection or recognition results from the trained detection or recognition model.

At block 506, a detection or recognition with a higher probability of correctness is selected from the detections or recognitions. For example, the confidence value of the detection or recognition may translate to a higher probability of correctness than the confidence values of the other detections or recognitions.

At block 508, a detection or recognition task is performed based on the selected detection or recognition. As one example, the detection or recognition task is performing a text detection or recognition task, and the media are images. In some examples, the detection task or recognition task can include identifying an object from an image, identifying an object from a video stream, identifying a recognizable word from an audio stream, and the like.

The process flow diagram of FIG. 5 is not intended to indicate that the operations of the method 500 are to be executed in any particular order, or that all of the operations of the method 500 are to be included in every case. Additionally, the method 500 can include any suitable number of additional operations. In some examples, detections or recognitions from the trained detection or recognition models for a second object in the image can be received, and the detections or recognitions for the second object are discarded in response to detecting that the detections or recognitions are associated with probabilities of correctness that do not exceed a threshold probability of correctness.

Figure 6:
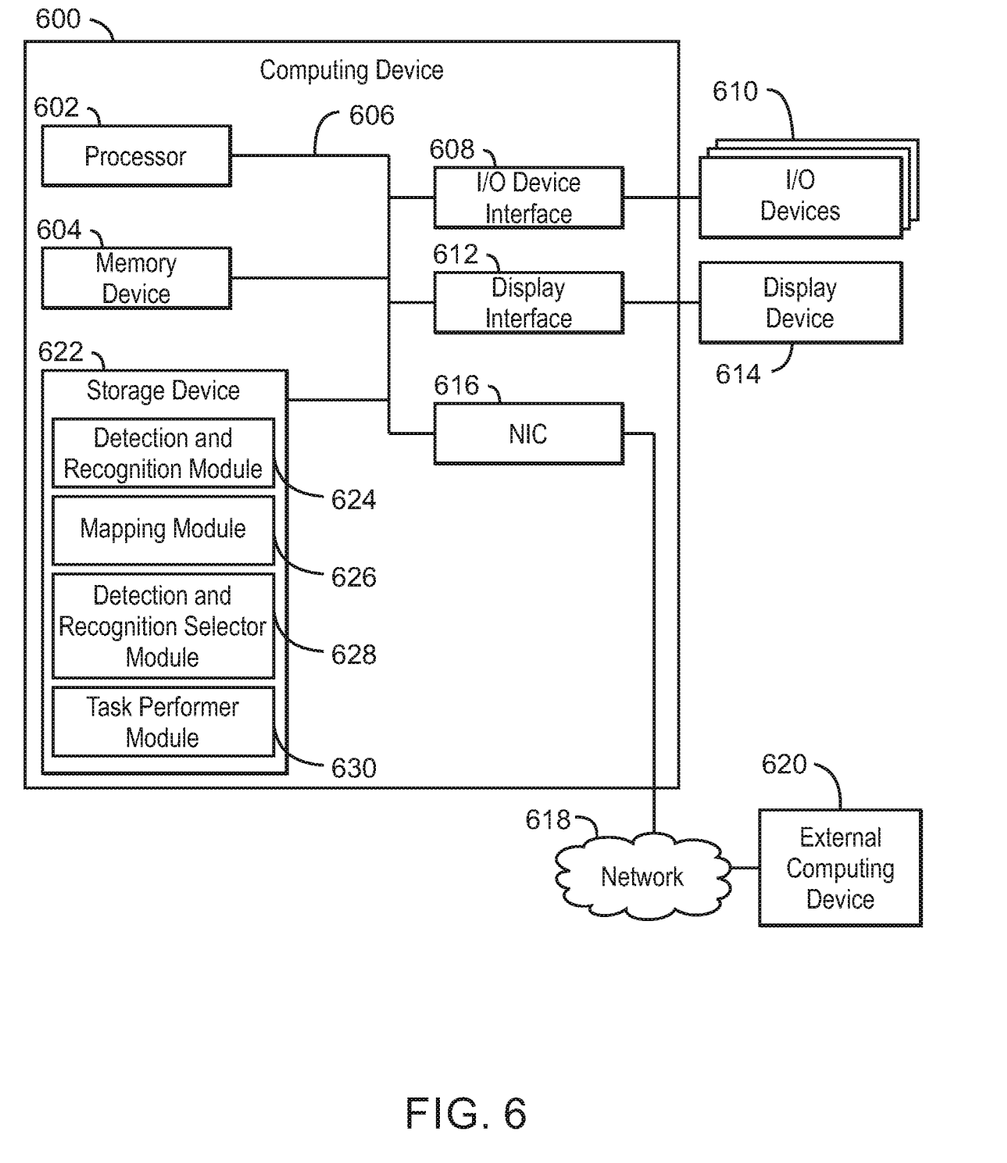
FIG. 6 is a block diagram of an example computing device that can generate correctness mappings and select object detections or recognition using the correctness mappings.

FIG. 6 is block diagram of an example computing device that can generate correctness mappings and select object detections or recognitions using the correctness mappings. The computing device 600 may be for example, a server, desktop computer, laptop computer, tablet computer, or smartphone. In some examples, computing device 600 may be a cloud computing node. Computing device 600 may be described in the general context of computer system executable instructions, such as program modules, being executed by a computer system. Generally, program modules may include routines, programs, objects, components, logic, data structures, and so on that perform particular tasks or implement particular abstract data types. Computing device 600 may be practiced in distributed cloud computing environments where tasks are performed by remote processing devices that are linked through a communications network. In a distributed cloud computing environment, program modules may be located in both local and remote computer system storage media including memory storage devices.

The computing device 600 may include a processor 602 that is to execute stored instructions, a memory device 604 to provide temporary memory space for operations of said instructions during operation. The processor can be a single-core processor, multi-core processor, computing cluster, or any number of other configurations. The memory 604 can include random access memory (RAM), read only memory, flash memory, or any other suitable memory systems.

The processor 602 may be connected through a system interconnect 606 (e.g., PCI®, PCI-Express®, etc.) to an input/output (I/O) device interface 608 adapted to connect the computing device 600 to one or more I/O devices 610. The I/O devices 610 may include, for example, a keyboard and a pointing device, wherein the pointing device may include a touchpad or a touchscreen, among others. The I/O devices 610 may be built-in components of the computing device 600, or may be devices that are externally connected to the computing device 600.

The processor 602 may also be linked through the system interconnect 606 to a display interface 612 adapted to connect the computing device 600 to a display device 614. The display device 614 may include a display screen that is a built-in component of the computing device 600. The display device 614 may also include a computer monitor, television, or projector, among others, that is externally connected to the computing device 600. In addition, a network interface controller (NIC) 616 may be adapted to connect the computing device 600 through the system interconnect 606 to the network 618. In some embodiments, the NIC 616 can transmit data using any suitable interface or protocol, such as the internet small computer system interface, among others. The network 618 may be a cellular network, a radio network, a wide area network (WAN), a local area network (LAN), or the Internet, among others. An external computing device 620 may connect to the computing device 600 through the network 618. In some examples, external computing device 620 may be an external webserver 620. In some examples, external computing device 620 may be a cloud computing node.

The processor 602 may also be linked through the system interconnect 606 to a storage device 622 that can include a hard drive, an optical drive, a USB flash drive, an array of drives, or any combinations thereof. In some examples, the storage device includes a detection and recognition module 624, a mapping module 626, a detection and recognition selector module 628, and a task performer module 630. The detection and recognition module 624 can receive a number of media and generate detections or recognitions with confidence scores for an object in the media. For example, the media can be images and the object can be an object that the detection and recognition module 624 is trained to detect. In some examples, the detection and recognition module 624 is a trained detection or recognition model that includes a trained convolutional neural network. The mapping module 626 can receive detections or recognitions with confidence scores for an object in a medium from a plurality of trained detection or recognition models. The mapping module 626 can then generate a probability of correctness for each of the detections or recognitions based on the confidence scores via correctness mappings generated for each of the trained detection or recognition models. The detection and recognition selector module 628 can select a detection or recognition with a higher probability of correctness from the detections or recognitions. The task performer module 630 can perform a detection or recognition task based on the selected detection or recognition. For example, the detection or recognition task can be text recognition.

It is to be understood that the block diagram of FIG. 6 is not intended to indicate that the computing device 600 is to include all of the components shown in FIG. 6. Rather, the computing device 600 can include fewer or additional components not illustrated in FIG. 6 (e.g., additional memory components, embedded controllers, modules, additional network interfaces, etc.). For example, the computing device 600 can include a mapping generator module to generate the correctness mappings. In various examples, the mapping generator module can generate correctness mappings based on input training media and result labels comprising correct detections or recognitions and incorrect detections or recognitions for each of the trained detection or recognition models. In some examples, the correctness mappings are graphs mapping confidence scores of a model to a probability of correctness. In some examples, the mapping generator module generate a binned graph including labeled detection or recognition results for each of the detection or recognition models and generate the correctness mappings for the each of the trained detection or recognition models using the generated binned graphs. For example, the generated binned graphs each comprise a predetermined number of bins, each of the bins representing a predetermined range of confidence scores for a corresponding trained detection or recognition model. Furthermore, any of the functionalities of the detection and recognition module 624, the mapping module 626, the detection and recognition selector module 628, and task performer module 630, may be partially, or entirely, implemented in hardware and/or in the processor 602. For example, the functionality may be implemented with an application specific integrated circuit, logic implemented in an embedded controller, or in logic implemented in the processor 602, among others. In some embodiments, the functionalities of the detection and recognition module 624, the mapping module 626, the detection and recognition selector module 628, and task performer module 630, can be implemented with logic, wherein the logic, as referred to herein, can include any suitable hardware (e.g., a processor, among others), software (e.g., an application, among others), firmware, or any suitable combination of hardware, software, and firmware.

Figure 7:
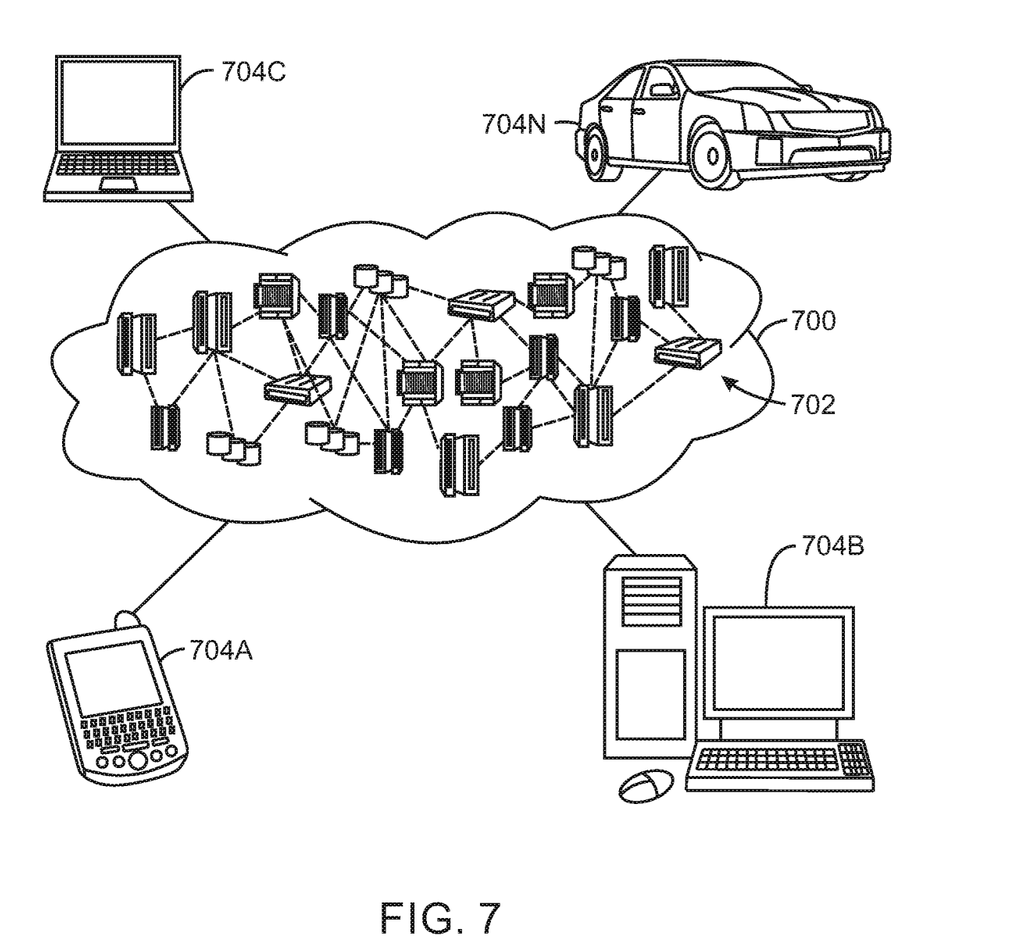
FIG. 7 is a process flow diagram of an example cloud computing environment according to embodiments described herein.

Referring now to FIG. 7, illustrative cloud computing environment 700 is depicted. As shown, cloud computing environment 700 comprises one or more cloud computing nodes 702 with which local computing devices used by cloud consumers, such as, for example, personal digital assistant (PDA) or cellular telephone 704A, desktop computer 704B, laptop computer 704C, and/or automobile computer system 704N may communicate. Nodes 702 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 704A-N shown in FIG. 7 are intended to be illustrative only and that computing nodes 702 and cloud computing environment 700 can communicate with any type of computerized device over any type of network and/or network addressable connection (e.g., using a web browser).

Figure 8:
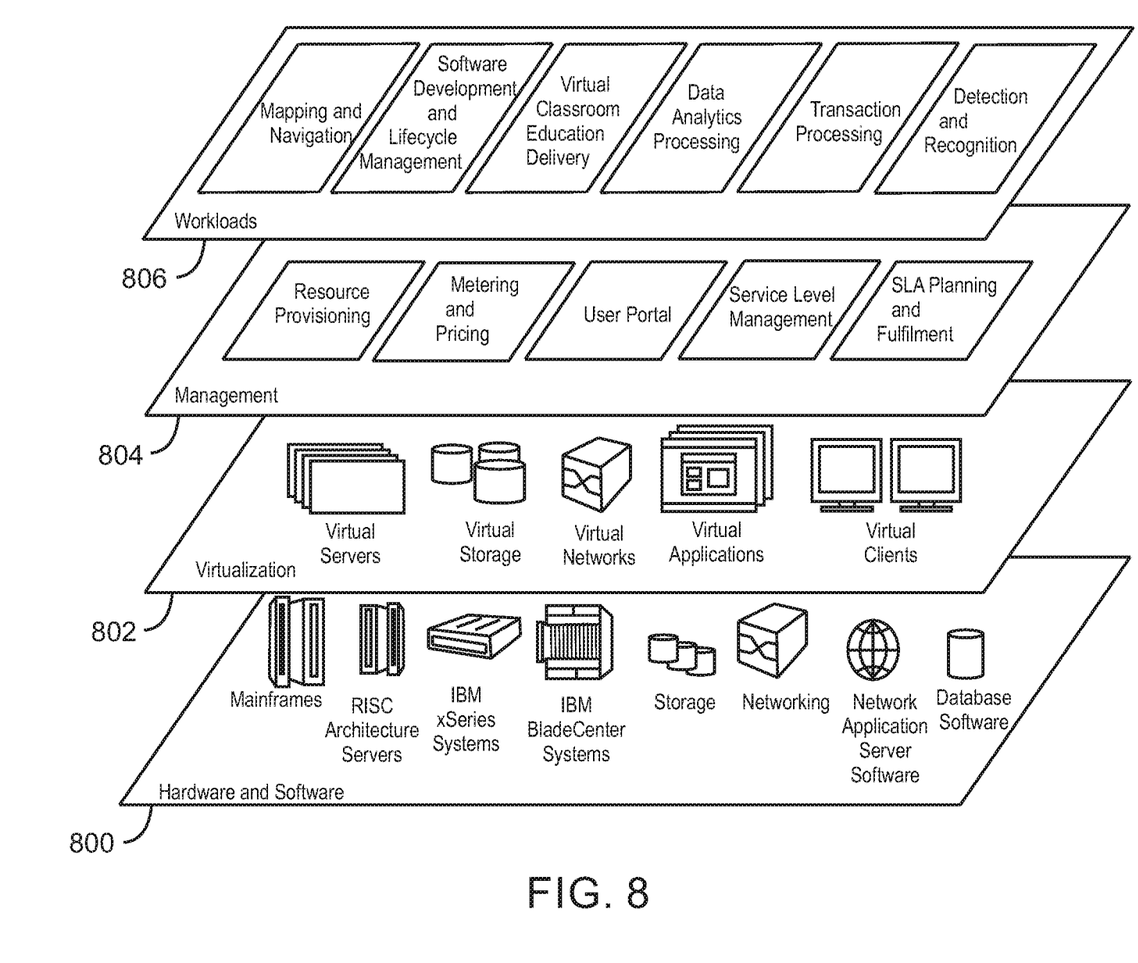
FIG. 8 is a process flow diagram of an example abstraction model layers according to embodiments described herein.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided.

Hardware and software layer 800 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 802 provides an abstraction layer from which the following examples of virtual entities may be provided: virtual servers; virtual storage; virtual networks, including virtual private networks; virtual applications and operating systems; and virtual clients. In one example, management layer 804 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 806 provides examples of functionality for which the cloud computing environment may be utilized. Examples of workloads and functions which may be provided from this layer include: mapping and navigation; software development and lifecycle management; virtual classroom education delivery; data analytics processing; transaction processing; and detection and recognition.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 9:
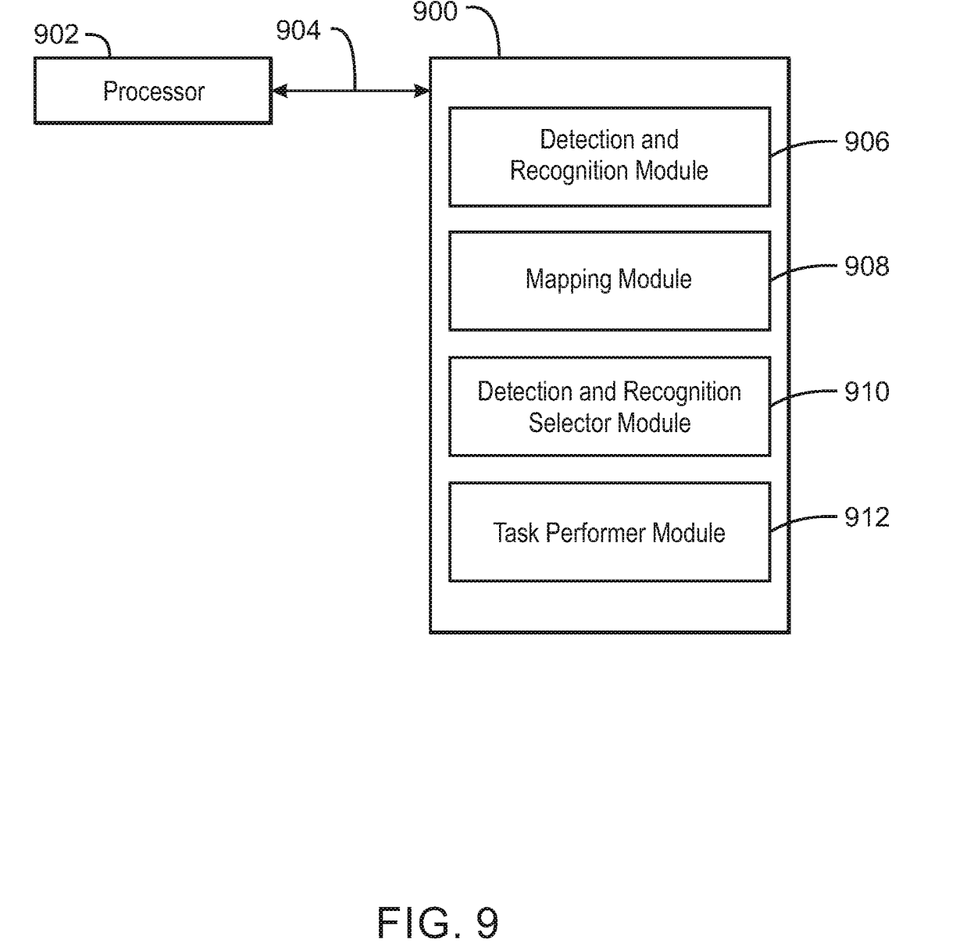
FIG. 9 is an example tangible, non-transitory computer-readable medium that can generate correctness mappings and select object detections or recognitions using the correctness mappings.

Referring now to FIG. 9, a block diagram is depicted of an example tangible, non-transitory computer-readable medium 900 that can generate correctness mappings and select object detections or recognitions using the correctness mappings. The tangible, non-transitory, computer-readable medium 900 may be accessed by a processor 902 over a computer interconnect 904. Furthermore, the tangible, non-transitory, computer-readable medium 900 may include code to direct the processor 902 to perform the operations of the methods 400 and 500 of FIGS. 4 and 5.

The various software components discussed herein may be stored on the tangible, non-transitory, computer-readable medium 900, as indicated in FIG. 9. For example, a detection and recognition module 906 includes code to generate detections or recognitions with confidence scores for an object in a medium. For example, the detection and recognition module 906 may include detection and recognition models trained to detect the object. A mapping module 908 includes code to receive detections or recognitions with confidence scores for an object in a medium from a plurality of trained detection or recognition models. The mapping module 908 also includes code to generate a probability of correctness for each of the detections or recognitions based on the confidence scores via correctness mappings generated for each of the trained detection or recognition models. A detection and recognition selector module 910 includes code to select a detection or recognition with a higher probability of correctness from the detections or recognitions. A task performer module 912 includes code to perform a detection or recognition task based on the selected detection or recognition. It is to be understood that any number of additional software components not shown in FIG. 9 may be included within the tangible, non-transitory, computer-readable medium 900, depending on the particular application. For example, the computer-readable medium 900 can include a mapping generator module that includes code to generate the correctness mappings based on input training media, a ground truth dataset, and detection or recognition results from the trained detection or recognition models. In various examples, the mapping generator module includes code to receive input training media, a ground truth dataset, and detection or recognition results with confidence scores from each of the trained detection or recognition models. The mapping generator module also includes code to label the detection or recognition results as correct or incorrect based on input media and the ground truth dataset. The mapping generator module also includes code to generate a correctness mapping between the confidence scores and probability of correctness based on labeled detection or recognition results and output scores for each of the trained detection or recognition models. In some examples, the mapping generator module also includes code to quantize the confidence scores of the detection or recognition models using a predetermined number of bins in a binned graph and plotting labeled detection or recognition results in the binned graph. In some examples, the mapping generator module also includes code to set a centroid of each group of labeled detection or recognition results in a bin of a binned graph as a certainty anchor. In some examples, the mapping generator module also includes code to generate a correctness mapping for each of the detection or recognition models by curve fitting quantized confidence scores to approximated probability of correctness in a binned graph generated for each of the detection or recognition models.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 9 may be included within the tangible, non-transitory, computer-readable medium 900, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive detections or recognitions with confidence scores for an object in a medium from a plurality of trained detection or recognition models;
generate a probability of correctness for each of the detections or recognitions based on the confidence scores via correctness mappings generated for each of the trained detection or recognition models, wherein the processor is to set a centroid of each group of labeled detection or recognition results in a bin of a binned graph as a certainty anchor;
select a detection or recognition with a higher probability of correctness from the detections or recognitions; and
perform a detection or recognition task based on the selected detection or recognition.

2. The system of claim 1, wherein the correctness mappings are generated based on input training media and result labels comprising correct detections or recognitions and incorrect detections or recognitions for each of the trained detection or recognition models.

3. The system of claim 1, wherein the correctness mappings comprise graphs mapping confidence scores of a model to a probability of correctness.

4. The system of claim 1, wherein the processor is to generate a binned graph comprising labeled detection or recognition results for each of the detection or recognition models and generate the correctness mappings for the each of the trained detection or recognition models using the generated binned graphs.

5. The system of claim 4, wherein the generated binned graphs each comprise a predetermined number of bins, each of the bins representing a predetermined range of confidence scores for a corresponding trained detection or recognition model.

6. The system of claim 1, wherein the detection or recognition task comprises text recognition.

7. The system of claim 6, wherein the trained detection or recognition model comprises a trained neural network.

8. A computer-implemented method, comprising:
receiving, via a processor, detections or recognitions with confidence scores for an object in a medium from a plurality of trained detection or recognition models;
generating, via the processor, a probability of correctness for each of the detections or recognitions based on the confidence scores via correctness mappings generated for each of the trained detection or recognition models, wherein generating the correctness mappings comprises setting a centroid of each group of labeled detection or recognition results in a bin of a binned graph as a certainty anchor;
selecting, via the processor, a detection or recognition with a higher probability of correctness from the detections or recognitions; and
performing, via the processor, a detection or recognition task based on the selected detection or recognition.

9. The computer-implemented method of claim 8, comprising generating the correctness mappings based on input training media, a ground truth dataset, and detection or recognition results from the trained detection or recognition models.

10. The computer-implemented method of claim 8, wherein generating the correctness mappings comprises:
receiving, via the processor, input training media, a ground truth dataset, and detection or recognition results with confidence scores from each of the trained detection or recognition models;
labeling, via the processor, the detection or recognition results as correct or incorrect based on input media and the ground truth dataset; and
generating, via the processor, a correctness mapping between the confidence scores and probability of correctness based on labeled detection or recognition results and output scores for each of the trained detection or recognition models.

11. The computer-implemented method of claim 8, wherein generating the correctness mappings comprises quantizing the confidence scores of the detection or recognition models using a predetermined number of bins and calculating a rate of correct samples in each bin.

12. The computer-implemented method of claim 8, comprising receiving detections or recognitions from the trained detection or recognition models for a second object in the medium, and discarding the detections or recognitions for the second object in response to detecting that the detections or recognitions are associated with probabilities of correctness that do not exceed a threshold probability of correctness.

13. The computer-implemented method of claim 8, wherein performing the detection or recognition task comprises performing a text detection or recognition task, the medium comprising an image.

14. A computer program product for performing detection or recognition tasks, the computer program product comprising a computer-readable storage medium having program code embodied therewith, wherein the computer-readable storage medium is not a transitory signal per se, the program code executable by a processor to cause the processor to:
receive detections or recognitions with confidence scores for an object in a medium from a plurality of trained detection or recognition models;
generate a probability of correctness for each of the detections or recognitions based on the confidence scores via correctness mappings generated for each of the trained detection or recognition models, wherein the processor is to set a centroid of each group of labeled detection or recognition results in a bin of a binned graph as a certainty anchor;
select a detection or recognition with a higher probability of correctness from the detections or recognitions; and
perform a detection or recognition task based on the selected detection or recognition.

15. The computer program product of claim 14, further comprising program code executable by the processor to generate the correctness mappings based on input training media, a ground truth dataset, and detection or recognition results from the trained detection or recognition models.

16. The computer program product of claim 14, further comprising program code executable by the processor to:
receive input training media, a ground truth dataset, and detection or recognition results with confidence scores from each of the trained detection or recognition models;
label the detection or recognition results as correct or incorrect based on input media and the ground truth dataset; and
generate a correctness mapping between the confidence scores and probability of correctness based on labeled detection or recognition results and output scores for each of the trained detection or recognition models.

17. The computer program product of claim 14, further comprising program code executable by the processor to quantize the confidence scores of the detection or recognition models using a predetermined number of bins in a binned graph and plotting the labeled detection or recognition results in the binned graph.

18. The computer program product of claim 14, further comprising program code executable by the processor to generate a correctness mapping for each of the detection or recognition models by curve fitting quantized confidence scores to approximated probability of correctness in a binned graph generated for each of the detection or recognition models.

* * * * *